Oct. 23, 1962 D. E. WARNER ET AL 3,059,347
PHONOGRAPH APPARATUS FOR FOREIGN LANGUAGE INSTRUCTION
Filed July 20, 1959 2 Sheets-Sheet 1
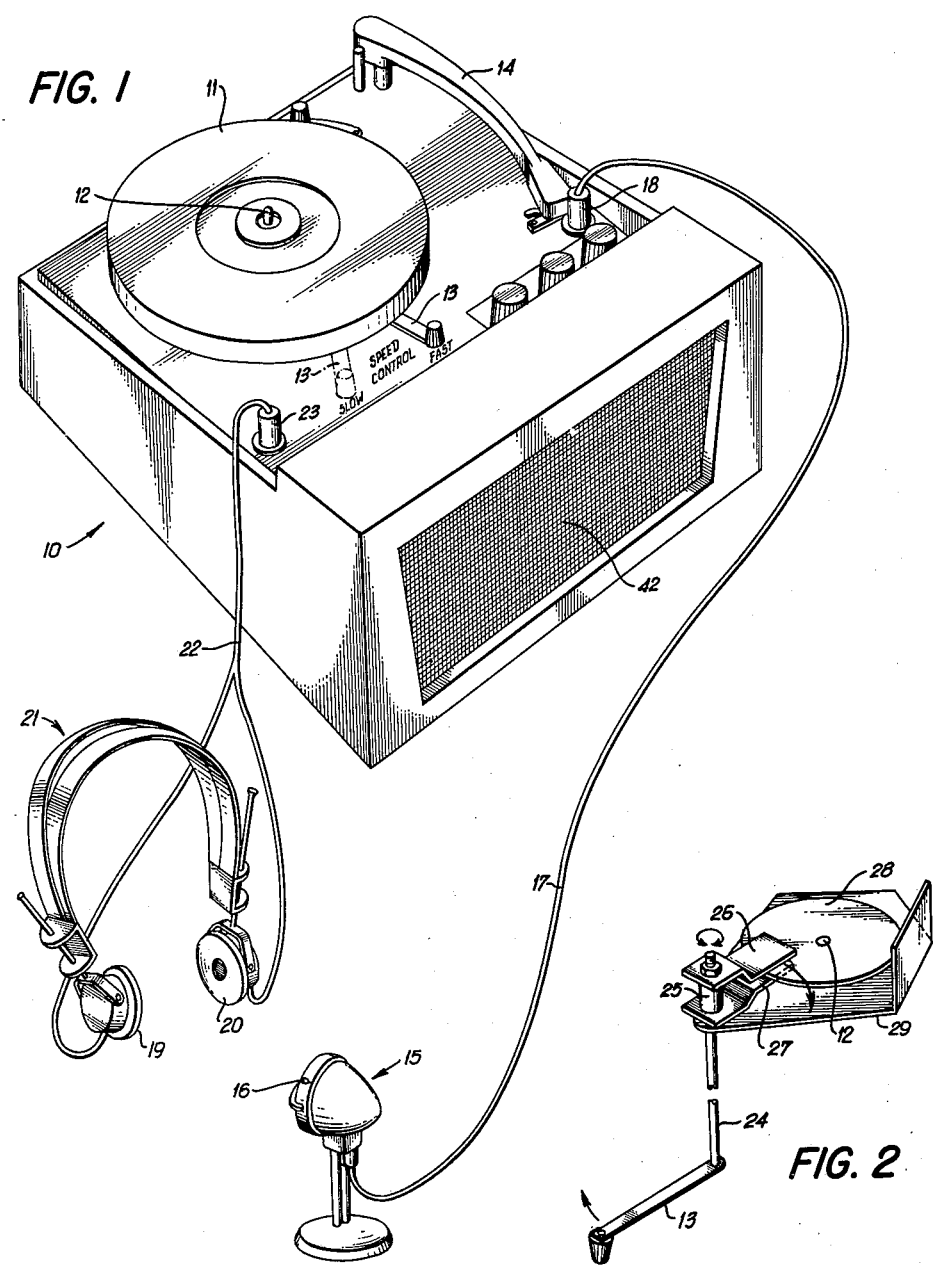
INVENTORS.
DONALD E. WARNER
BY WILLIAM E. WILLIAMS
*R. E. Jeangue*
ATTORNEY.

INVENTORS.
DONALD E. WARNER
BY WILLIAM E. WILLIAMS
ATTORNEY.

3,059,347
PHONOGRAPH APPARATUS FOR FOREIGN LANGUAGE INSTRUCTION

Donald E. Warner and William E. Williams, Los Angeles, Calif., assignors to Audiotronics Corporation, North Hollywood, Calif., a corporation of California
Filed July 20, 1959, Ser. No. 828,174
2 Claims. (Cl. 35—35)

The present invention relates to phonograph apparatus for foreign language instruction and, more particularly, to a simple and inexpensive combination of phonograph, earphones and microphone for permitting a student of a foreign language to play back a recording of a person speaking a foreign language with spaced periods for student response and permitting the student to hear his own voice and readily control the volume thereof while repeating the subject matter of the record during such response periods.

It has been found to be highly desirable to teach foreign languages by means of recordings of persons speaking their native languages and permitting the student to repeat the subject matter immediately after hearing same so as to have an immediate responsive comparison with the correct pronunciation of the foreign word or words. As is well known, the human voice does not sound the same to the speaker as it does to the listener. Therefore, it has been found to be desirable to permit the student to hear his own voice repeating the words as he speaks them during the response periods interposed between the recorded subject-matter. However, most phonographic and audio systems for performing this function require relatively complicated and expensive equipment which, in addition, the average student finds difficult to operate. Further, such equipment is peculiarly designed for oral-aural instruction and is not readily usable or adaptable for use as home equipment.

According to the present invention, the audio amplification circuit of an ordinary phonograph is provided with a microphone circuit for permitting the insertion and amplification of the student's own voice by the same amplifier circuit that amplifies the speed picked up by the phonograph pick-up itself, and a headset earphone circuit inserted into the usual speaker circuit after the amplifier circuit for use by the student to hear his own voice simultaneously as he speaks. Further, a speed control is provided for the phonograph to permit the student to adjust the length of the response period in accordance with his own desires or reaction time. The microphone circuit is located subsequent to the volume control for the phonograph pick-up so that selected variations in the volume of the sound reproduced from the phonograph record do not affect the volume of the sound from the students, the student having selective control over his own reproduced sound volume by selective manual physical disposition of the microphone with respect to his mouth.

Therefore, one of the objects of the present invention is the provision of a simple and inexpensive combination of a phonograph, headset earphones and a microphone for obtaining aural reproduction of a phonograph record having prerecorded spaced speech of a foreign language thereon with non-aural response periods therebetween and permitting the student of such foreign language to respond during such response periods by repeating into the microphone the sounds he has just heard and simultaneously hearing his own speech through such earphones.

Another object of this invention is the provision of a phonograph having a simple and inexpensive audio amplification circuit having a microphone circuit inserted subsequent to the volume control and an earphone circuit in the usual speaker circuit following such amplification circuit whereby variation in the setting of the volume control does not alter the volume of the sound amplified in accordance with the electrical variations present in the microphone circuit.

A further object of this invention is to provide such a system with a phonograph record speed control for selectively varying the time length of response periods in accordance with the desires and/or reaction time of the individual student operator.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which, FIGURE 1 is a perspective view of combined apparatus in accordance with the present invention;

FIGURE 2 is a perspective fragmentary view illustrating one form of phonograph speed control apparatus for use in the phonograph illustrated in FIGURE 1;

Figure 3:
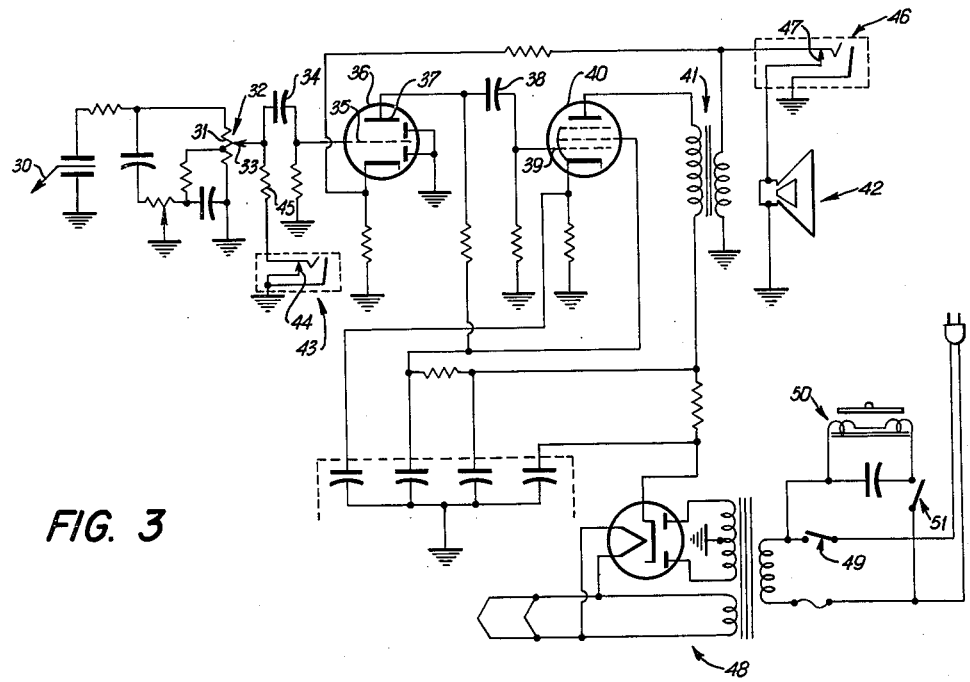
FIGURE 3 is a schematic circuit diagram illustrating the relative locations in the circuit of the physical components shown in FIGURE 1.

Referring to the drawings, FIGURE 1 shows a phonogarph, indicated generally at 10, having a turntable 11 which is rotatable by means of a motor shaft 12. A speed control lever 13 is movable from the "fast" position shown to the "slow" position indicated in dotted lines, or any position therebetween. A pick-up arm 14 is provided with a stylus (not shown) for reproducing the information from a disc record (not shown) in the well known manner. A microphone, indicated generally at 15, is provided with a button 16 for selective operation of an actuating switch for the microphone 15. A microphone cord 17 connects the microphone to the phonograph 10 by means of a plug 18, the particular circuit connection being discussed hereinafter. Earphones 19 and 20 are provided with a headset mounting, indicated generally at 21, for maintaining the earphones 19 and 20 in their appropriate position against the ears of the student user. Earphone cord 22 connects the earphones 19 and 20 to the phonograph 10 by means of a plug 23, the circuit connection being described hereinafter.

Referring to FIGURE 2, one form of speed control means is illustrated as including the speed control lever 13 adapted to pivot the rod 24. A magnet 25 is mounted upon the rod 24 and provided with magnetically permeable arms 26 and 27 which rotate with rod 24 and provide a magnetic drag upon the magnetically permeable disc 28, the latter being secured to the motor shaft 12 which rotates the turntable 11. Therefore, the speed of the turntable 11 is selectively variable by means of the variation in drag upon the disc 28 obtained in accordance with the position of the opposed arms 26 and 27 with respect to the disc 28; that is, the larger the portion of the disc 28 covered by the arms 26 and 27, the greater the amount of drag upon such disc. Bracket 29 mounts the rod and magnet structure to the phonograph 10.

Figure 4:
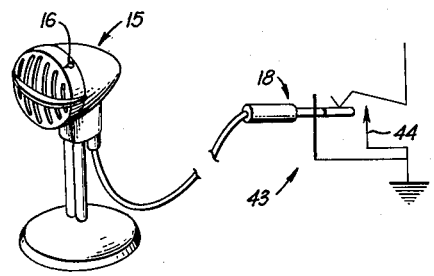
FIGURE 4 is a perspective view, partly schematic, illustrating the operation of the microphone plug and jack in the amplifier input circuit of FIGURE 3.
Figure 5:
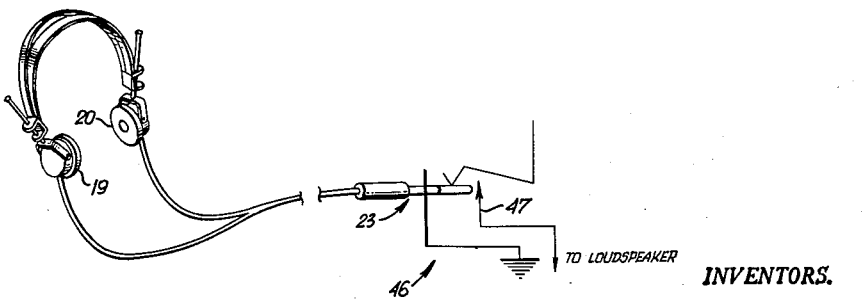
FIGURE 5 is a perspective view, partly schematic, illustrating the operation of the earphone plug and jack in the amplifier output and speaker circuit illustrated in FIGURE 3.

Turning to FIGURE 3, there may be seen a schematic diagram of an amplifier and motor circuit for a phonograph in accordance with well known principles. The movement of the stylus 30 over the record grooves produces electrical variations, in accordance with the sound to be reproduced, across the resistance portion 31 of the volume control potentiometer indicated generally at 32. The signals are coupled through sliding contact 33 and coupling capacitor 34 to the grid 35 of triode 36, which may be a 6AV6 type, for the first stage of audio amplification. The amplified signal is coupled from the plate 37 of tube 36 through capacitor 38 to the control grid 39 of power amplifier tube 40, which may be a 6BQ5 type. The amplified signal is presented across the audio power output transformer 41. The speaker 42 is responsive to the output signal presented by transformer 41 for aural presentation of the information picked up by stylus 30. A microphone jack, indicated generally at 43, includes contact 44 which closes the circuit for resistor 45 to ground in the absence of the presence of microphone plug 18 in the jack 43. As seen in FIGURE 4, insertion of the microphone plug 18 into the jack 43 inserts the circuitry of the microphone 15 in series with the resistor 45 to ground. It should be noted that the microphone output is inserted into the amplifier circuitry subsequent to the volume control potentiometer 32 and prior to the input coupling capacitor 34 so that variations in the setting of the volume control 32 for varying the volume of the aural reproduction of the information picked up by stylus 30 has substantially no effect upon the amplitude of the signals produced by the microphone circuit. With reference to the output portion of the amplifier circuit, note that speaker 42 is only in the circuit when the earphone plug 23 is not inserted into the earphone jack, indicated generally at 46, so that contact 47 is closed to connect the speaker 42 to the output transformer 41. As shown in FIGURE 5, insertion of the earphone plug 23 into the jack 46 causes opening of the contact 47 so as to remove the speaker 42 from the circuit while placing the earphones 19 and 20 into the output circuit. A rectifier, indicated generally at 48, provides the necessary filament and plate voltages for operation of the amplifier. The main power switch 49 actuates the rectifier 48 and makes available the line voltage to the phonograph motor 50 upon closing of the phonograph motor switch 51.

In operation, the microphone and earphone plugs 18 and 23, respectively, will be inserted into their respective jacks 43 and 46. A record (not shown) containing prerecorded information in the form of words of a foreign language, preferably spoken by a native of the corresponding country, with spaced response periods between each word or combination of words, will be placed upon the turntable 11 and rotated thereby in accordance with the speed of the phonograph motor 50 so that the information will be picked up by the stylus 30 for translation into electrical signals. Such electrical signals will be amplified for aural reproduction by the earphones 19 and 20, the latter being placed upon the ears of a student. The volume of such aural reproduction may be readily controlled by the student's manipulation of the volume control 32, as he desires. In addition, the student may vary the length of the response periods interposed between the prerecorded spoken information by simply varying the disposition of the speed control lever 13, thereby permitting the student to have sufficient time for double repetition of the prerecorded information, if desired. Of course, varying the speed of the motor also varies the tone of the aural reproduction of the prerecorded information; however, it has been found that considerable variation in the speed is permissible without undue degradation of the intonation and other tonal qualities of the spoken words. During such response periods, the student repeats into the microphone the just-heard word or words as a means of practicing his own oral facility with the foreign language and simultaneously hears his own voice by means of the earphones. It has been found that the student thus hears his own voice with substantially the same tonal qualities as heard by others, thus increasing the student's self-teaching abilities and enhancing his facility with the foreign language. Preferably, the microphone 15 is provided with a button 16 so that the student actuates the microphone circuit only when he is speaking into the microphone, thus minimizing background noises he might otherwise hear during the reproduction of the prerecorded information on the record. Since the microphone is inserted into the input of the amplifier subsequent to the volume control 32, the student may control the volume of the prerecorded information, as presented to his earphones, without affecting the volume of his own voice as presented by such earphones. The student may readily control the aurally reproduced volume of his own voice by moving the microphone 15 physically with respect to his mouth. This auto-control permits the use of the apparatus by many students with differing natural vocal volumes without requiring resetting of volume controls within the amplifier circuit itself.

An additional advantage obtainable through the combined phonograph apparatus of the present invention resides in the ease with which the apparatus may be converted into an ordinary phonograph by simply removing the earphone and microphone plugs from their respective jacks. Removal of the earphone plug 23 from its corresponding jack 46 inserts the speaker 42 into connection with the output transformer 41 for desired use thereof. Thus, the present equipment is ideally suited for home use for both teaching foreign languages and ordinary phonograph usage without unnecessary duplication and expense of equipment.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:

1. Phonograph apparatus for use by a student in learning the pronunciation of words of a foreign language by means of a phonograph record having prerecorded information in the form of such words with spaced response periods between each word or combination of words comprising, in combination: a turntable; pick up means and an amplifier circuit for reproducing such information from such phonograph record; earphones adapted to be worn by such student for aural reproduction of such information and connected into said amplifier circuit at the output thereof; a microphone connected into said amplifier circuit at the input thereof for permitting such student to repeat such information immediately following each portion thereof during corresponding response periods whereby such student-spoken information will be simultaneously aurally reproduced by said earphones for informing the student as to the sound of the information as spoken by his own voice; and selectively variable speed control means for said turntable for varying the length of the response periods.

2. Phonograph apparatus for use by a student in learning the pronunciation of words of a foreign language by means of a phonograph record having prerecorded information in the form of such words with spaced response periods between each word or combination of words comprising, in combination: a turntable; pick up means and an amplifier circuit for reproducing such information from such phonograph record; earphones adapted to be worn by such student for aural reproduction of such information and connected into said amplifier circuit at the output thereof; a microphone connected into said amplifier circuit at the input thereof for permitting such student to repeat such information immediately following each portion thereof during corresponding response periods whereby such student-spoken information will be simultaneously aurally reproduced by said earphones for informing the student as to the sound of the information as spoken by his own voice; and said amplifier circuit including a volume control for varying the volume of said reproduced information from said phonograph record, and such connection of said microphone to said amplifier circuit is electrically subsequent to said volume control whereby the aural reproduction of such student's voice by said amplifier circuit and said earphones is only affected by the volume of sound of said student's voice picked up by said microphone.

References Cited in the file of this patent

UNITED STATES PATENTS

| | | |
|---|---|---|
| 1,229,142 | Saenger | June 5, 1917 |
| 1,897,557 | Graham | Feb. 14, 1933 |
| 2,089,165 | Oliver | Aug. 3, 1937 |
| 2,109,602 | Weiss | Mar. 1, 1938 |
| 2,627,555 | Luberoff | Feb. 3, 1953 |
| 2,704,803 | Crowle et al. | Mar. 22, 1955 |
| 2,768,234 | Popp | Oct. 23, 1956 |
| 2,876,561 | Horne | Mar. 10, 1959 |

OTHER REFERENCES

Heath: "A Language Laboratory Handbook for 1956" (pages 18, 19 and 24 only).

King, P. E. (Pamphlet): "Language Teaching Comes of Age" (pages 1 and 5–9), copyrighted in 1958, Magnetic Recording Industries, N.Y., N.Y.